(12) United States Patent
Kim et al.

(10) Patent No.: US 8,755,298 B2
(45) Date of Patent: Jun. 17, 2014

(54) METHOD AND APPARATUS FOR RANDOM ACCESS IN A WIRELESS COMMUNICATION SYSTEM

(75) Inventors: So Yeon Kim, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 13/382,465

(22) PCT Filed: Jul. 6, 2010

(86) PCT No.: PCT/KR2010/004393
§ 371 (c)(1),
(2), (4) Date: Jan. 5, 2012

(87) PCT Pub. No.: WO2011/005011
PCT Pub. Date: Jan. 13, 2011

(65) Prior Publication Data
US 2012/0113939 A1      May 10, 2012

Related U.S. Application Data

(60) Provisional application No. 61/223,371, filed on Jul. 6, 2009, provisional application No. 61/223,707, filed on Jul. 8, 2009, provisional application No. 61/259,970, filed on Nov. 10, 2009.

(51) Int. Cl.
  *H04W 72/04*  (2009.01)
(52) U.S. Cl.
  USPC .......................................... 370/252; 370/328
(58) Field of Classification Search
  USPC .......................... 370/252, 328, 329, 503–520
  See application file for complete search history.

(56) References Cited

U.S. PATENT DOCUMENTS

2010/0015967 A1*   1/2010   Perets et al. ................ 455/422.1

FOREIGN PATENT DOCUMENTS

WO    WO 2010094325 A1 *   8/2010

OTHER PUBLICATIONS

Texas Instruments, "Further Views on Initial Access with Asymmetric Carrier Aggregations," 3GPP TSG RAN WGI #57 meeting, 3GPP RI-091837, May 4-8, 2009, whole document.*
3GPP, "Technical Specification Group Radio Access Network; Further Advancements for E-UTRA l Physical Layer Aspects (Release 9)", 3GPP TR 36.814, V0.4.1, Feb. 2009, whole document.*
ETSI TS 136 300 V8.8.0 (Apr. 2009) Technical Specification LTE; Evolved Universal Terrestrial Radio Access (E-UTRA) and Evolved Universal Terrestrial Radio Access Network (E-UTRAN); Overall description; Stage 2 (3GPP TS 36.300 version 8.8.0 Release 8), pp. 52-53,143.*

(Continued)

*Primary Examiner* — Andrew Chriss
*Assistant Examiner* — Jose Perez
(74) *Attorney, Agent, or Firm* — Birch, Stewart, Kolasch & Birch, LLP

(57) ABSTRACT

The present invention relates to a method and to an apparatus for random access in a wireless communication system to which carrier aggregation is applied. According to one aspect of the present invention, a method in which a base station supports random access of a terminal in a wireless communication system that supports carrier aggregation, comprises a step in which the base station allocates, to the terminal, a dedicated PRACH preamble for a second random access in an uplink component carrier (hereinafter, referred to as UL CC) which is additionally allocated or the configuration of which is changed after a first random access, and receives the dedicated PRACH preamble from the terminal.

12 Claims, 10 Drawing Sheets

(56) References Cited

OTHER PUBLICATIONS

ETSI TS 136 211 V8.6.0 (Apr. 2009) LTE; Evolved Universal Terrestrial Radio Access (E-UTRA); Physical channels and modulation (3GPP TS 36.211 version 8.6.0 Release 8), pp. 36-46.*

ETSI TS 136 211 V8.7.0 (Jun. 2009) LTE; Evolved Universal Terrestrial Radio Access (E-UTRA); Physical channels and modulation (3GPP TS 36.211 version 8.7.0 Release 8), pp. 34-44.*

ETSI TS 136 300 V8.9.0 (Jul. 2009) LTE; Evolved Universal Terrestrial Radio Access (E-UTRA) and Evolved Universal Terrestrial Radio Access Network (E-UTRAN); Overall description; Stage 2 (3GPP TS 36.300 version 8.9.0 Release 8), pp. 50-51.*

3GPP TS 36.300 V9.0.0 (Jun. 2009) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), pp. 51-52.*

3GPP, "Technical Specification Group Radio Access Network; Further Advancements for E-UTRA Physical Layer Aspects (Release 9)", 3GPP TR 36.814, V0.4.1, Feb. 2009, 31 pages.

Huawei, "Carrier aggregation in active mode", 3GPP TSG-RAN WG2 Meeting #66, R2-093104, May 4-8, 2009, 4 pages.

Motorola, "Control Channel Design Issues for Carrier Aggregation in LTE-A", 3GPP TSG RAN1#55, R1-084424, Nov. 10-14, 2008, 4 pages.

Texas Instruments, "Further views on initial access with asymmetric carrier aggregation", 3GPP TSG RAN WG1 #57, R1-091837, May 4-8, 2009, 3 pages.

* cited by examiner (a)

(b)

(a)

(b)

(c)

METHOD AND APPARATUS FOR RANDOM ACCESS IN A WIRELESS COMMUNICATION SYSTEM This application is the National Phase of PCT/KR2010/004393 filed on Jul. 6, 2010, which claims priority under 35 U.S.C. 119 (e) to U.S. Provisional Application Nos. 61/223,371, 61/223,707, 61/259,970 filed on Jul. 6, 2009, Jul. 8, 2009, and Nov. 10, 2009 respectively, all of which are hereby expressly incorporated by reference into the present application.

TECHNICAL FIELD

The present invention relates to a wireless communication system, and more particularly, to a random access method and apparatus in a wireless communication system to which carrier aggregation is applied.

BACKGROUND ART

First, a frame structure and resource structure of a wireless communication system will be described with reference to FIGS. 1 and 2. FIG. 1 is a diagram showing an example of a frame structure of a wireless communication system. As shown in FIG. 1, one frame includes 10 subframes, and one subframe includes two slots. A time consumed for transmitting one subframe is referred to as a Transmission Time Interval (TTI). For example, one subframe may have a length of 1 ms and one slot may have a length of 0.5 ms.

One slot may include a plurality of orthogonal frequency division multiplexing (OFDM) symbols. The OFDM symbol may be called an SC-FDMA symbol or a symbol period.

One slot may include 7 or 6 OFDM symbols according to the length of a cyclic prefix (hereinafter, referred to as "CP"). In a long term evolution (hereinafter, referred to as "LTE") system, there are a normal CP and an extended CP. In case of using the normal CP, one slot includes 7 OFDM symbols and, in case of using the extended CP, one slot includes 6 OFDM symbols. The extended CP is used when delay spread is large.

FIG. 2 is a diagram showing a resource structure of one downlink slot. FIG. 2 shows one slot including 7 OFDM symbols. A resource element (RE) is a resource region including one OFDM symbol and one subcarrier and a resource block (RB) is a resource region including a plurality of OFDM symbols and a plurality of subcarriers. For example, the RB may include 7 OFDM symbols in a time domain and 12 subcarriers in a frequency domain. The number of RBs included in one slot may be determined according to a downlink bandwidth.

An LTE-A system which is currently being standardized supports carrier aggregation. Carrier aggregation refers to technique of collecting a plurality of carriers so as to extend a bandwidth in order to increase a data rate.

Multicarrier refers to an overall frequency band used by a base station and a component carrier refers to an element carrier configuring multicarrier. That is, a plurality of component carriers configures multicarrier through carrier aggregation.

A user equipment (UE) of an LTE Rel-8 system completes random access on component carriers in which a single downlink and a single uplink are linked one-to-one, after completing contention-based random access. However, a UE of an LTE-A system using carrier aggregation may be allocated one or more uplink component carriers and timing advances of the allocated one or more uplink component carriers may differ. Accordingly, there is an ambiguity in timing advances of one or more component carriers.

DISCLOSURE

Technical Problem

As described above, according to the conventional technique, in the case in which carrier aggregation is applied, if a UE is assigned a plurality of component carriers after random access, there is an ambiguity in timing advances of a plurality of component carriers.

An object of the present invention is to provide a random access method capable of eliminating an ambiguity in timing advances of a plurality of component carriers in a system to which carrier aggregation is applied.

The technical problems solved by the present invention are not limited to the above technical problems and those skilled in the art may understand other technical problems from the following description.

Technical Solution

The object of the present invention can be achieved by providing a method of supporting random access of a user equipment (UE) in a base station of a wireless communication system supporting carrier aggregation, including assigning, to the UE, a dedicated physical random access channel (PRACH) preamble for second random access on a uplink component carrier (UL CC) which is additionally assigned or reconfigured after first random access, and receiving the dedicated PRACH preamble from the UE.

In another aspect of the present invention, there is provided a random access method in a user equipment (UE) of a wireless communication system supporting carrier aggregation, including, at a base station, assigning a dedicated physical random access channel (PRACH) preamble for second random access on a uplink component carrier (UL CC) which is additionally assigned or reconfigured after first random access, and transmitting the dedicated PRACH preamble to the base station.

In another aspect of the present invention, there is provided a base station of a wireless communication system supporting carrier aggregation, including a processor configured to assign, to a user equipment (UE), a dedicated physical random access channel (PRACH) preamble for second random access on a uplink component carrier (UL CC) which is additionally assigned or reconfigured after first random access, a transmission module configured to transmit information about the dedicated PRACH to the UE, and a reception module configured to receive the dedicated PRACH preamble from the UE.

In another aspect of the present invention, there is provided a user equipment (UE) of a wireless communication system supporting carrier aggregation, including a reception module configured to receive, from a base station, information about a dedicated physical random access channel (PRACH) preamble for second random access on a uplink component carrier (UL CC) which is additionally assigned or reconfigured after first random access, and a transmission module configured to transmit the dedicated PRACH preamble to the base station.

At this time, the reception module may receive information about a time and frequency domain in which the dedicated PRACH preamble will be transmitted.

If a plurality of UL CCs is additionally assigned or configurations thereof are changed after the first random access, the plurality of UL CCs may be divided into UL CC groups such that UL CCs using the same timing advance belong to the same group, and the dedicated PRACH preamble may be used for the second random access in the UL CC group.

The transmission module may transmit the dedicated PRACH preamble from the UE through one of the plurality of UL CCs belonging to the UL CC group.

The reception module may receive information about the dedicated PRACH preamble from the base station through UE-specific dedicated signaling.

Advantageous Effects

According to the embodiments of the present invention, it is possible to eliminate an ambiguity in timing advances of a plurality of component carriers in a system to which carrier aggregation is applied The effects of the present invention are not limited to the above-described effects and other effects which are not described herein will become apparent to those skilled in the art from the following description.

BEST MODE

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters. For example, although the following description is given on the assumption that a mobile communication system is a 3GPP2 802.16 system, the present invention is applicable to other mobile communication systems except for the unique matters of the 3GPP2 802.16 system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, assume that a terminal is a generic term for a mobile or fixed user-end device such as a user equipment (UE), a mobile station (MS) and the like. In addition, assume that a base station is a generic term for any node of a network end, which communicates with a terminal, such as a Node B, an eNode B and the like.

First, carrier aggregation will be described with reference to FIGS. 3 and 4.

Environments considered in the embodiment of the present invention include all general multicarrier supporting environments. That is, a multicarrier system or carrier aggregation system described in the present invention refers to a system for aggregating and using one or more carriers each having a bandwidth smaller than a target bandwidth when configuring a target wideband, in order to support a wideband.

When one or more carriers each having a bandwidth smaller than a target bandwidth are aggregated, the bandwidths of aggregated carriers may be limited to bandwidths used in the conventional system, for backward compatibility with the conventional system. Since the conventional 3GPP LTE system supports bandwidths of 3, 5, 10, 15 and 20 MHz, an LTE_A system supports a bandwidth greater than 20 MHz using only 1.4, 3, 5, 10, 15 and 20 MHz. Alternatively, a new bandwidth may be defined to support carrier aggregation, regardless of the bandwidths used in the conventional system.

Multicarrier may be used interchangeably with carrier aggregation or bandwidth (BW) aggregation.

Techniques of managing a plurality of carriers by one Medium Access Control (MAC) layer in order to efficiently use multicarrier will be described.

Figure 1:
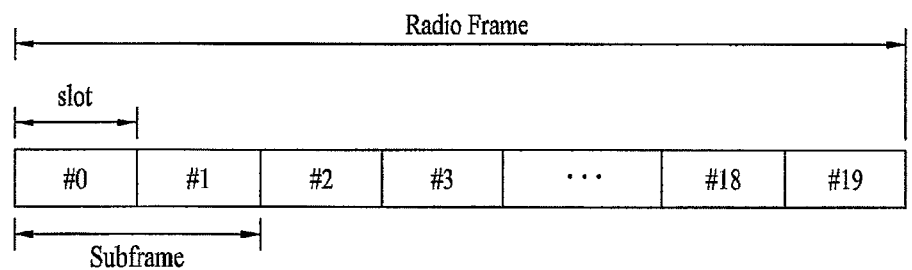
FIG. 1 is a diagram showing an example of a frame structure of a wireless communication system.
Figure 2:
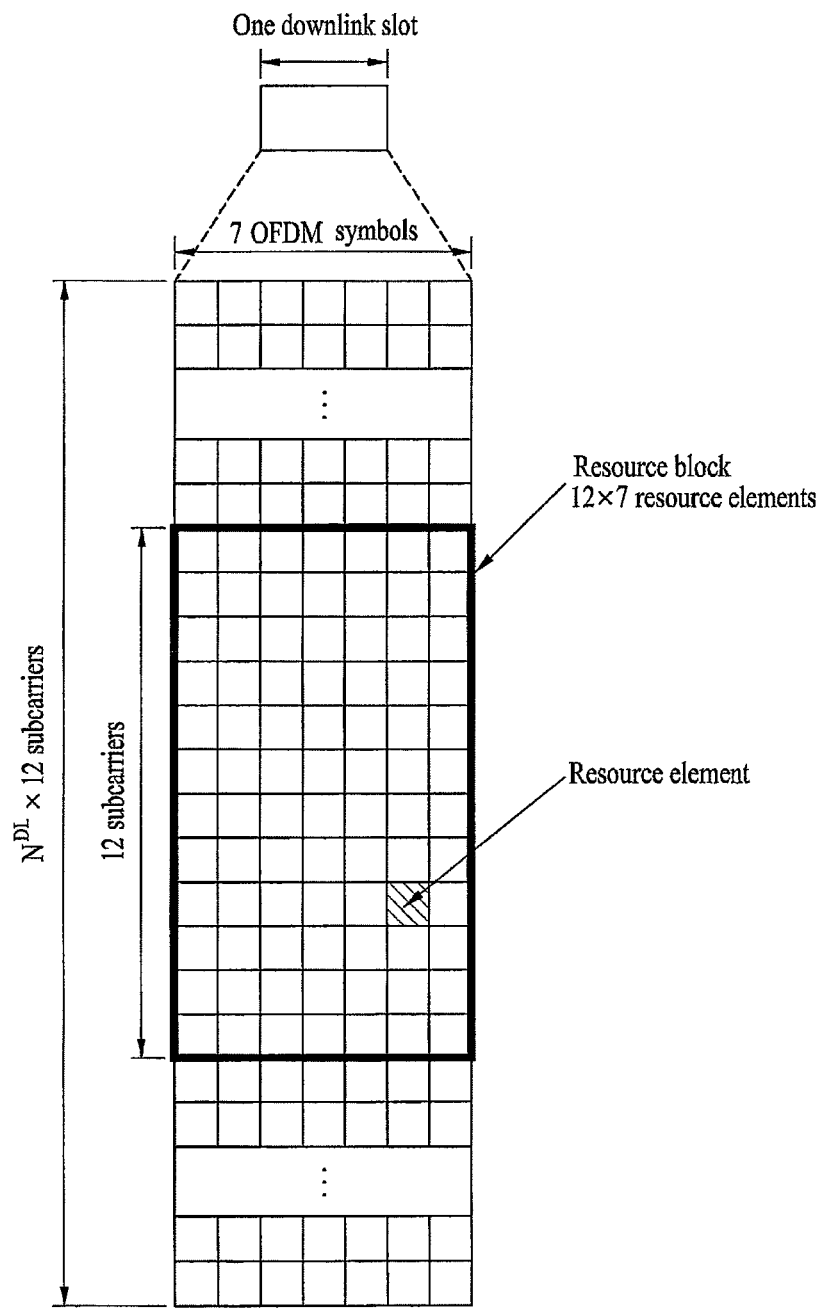
FIG. 2 is a diagram showing a resource structure of one downlink slot.
Figure 3:
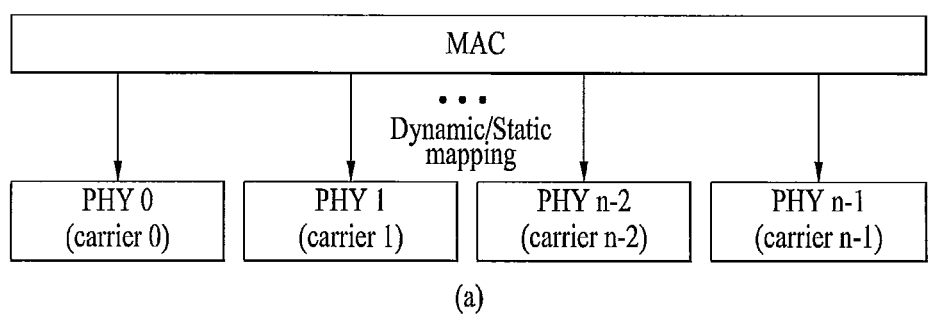
FIG. 3($a$) is a diagram showing a transmission unit in which a plurality of carriers is managed by one MAC layer and FIG. 3($b$) is a diagram showing a reception unit in which a plurality of carriers is managed by one MAC layer.
Figure 3:
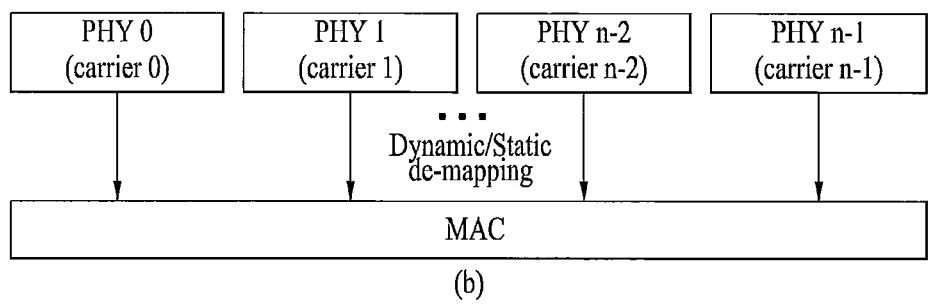

FIG. 3($a$) is a diagram showing a transmission unit in which a plurality of carriers is managed by one MAC layer and FIG. 3($b$) is a diagram showing a reception unit in which a plurality of carriers is managed by one MAC layer. At this time, in order to efficiently transmit or receive multicarrier, both a transmitter and a receiver can transmit or receive multicarrier.

As shown in FIG. 3, one MAC layer manages and transmit/receives one or more component carriers. At this time, since the component carriers managed by one MAC layer do not need to be contiguous to each other, resource management is flexible. That is, both contiguous carrier aggregation and discontiguous carrier aggregation are possible.

Alternatively, a plurality of MACs may control a plurality of component carriers.

Figure 4:
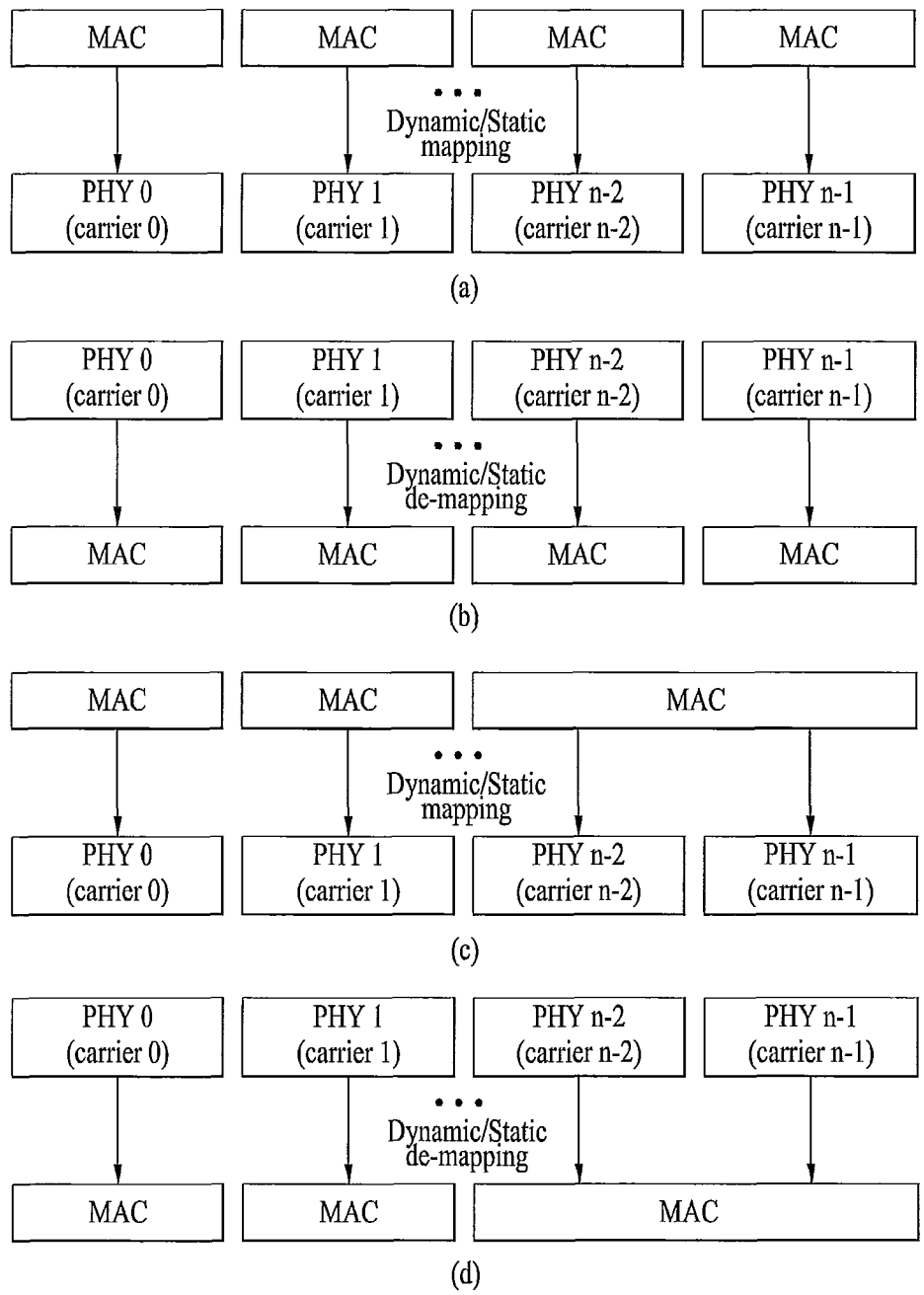
FIG. 4 is a diagram showing the case where a plurality of MACs controls a plurality of component carriers.

FIG. 4 is a diagram showing the case in which a plurality of MACs controls a plurality of component carriers.

As shown in FIGS. 4($a$) and 4($b$), each of the plurality of MACs may control each of the plurality of component carriers in one-to-one correspondence and, as shown in FIGS. 4($c$) and 4($d$), the plurality of MACs may control some component carriers in one-to-one correspondence and one MAC layer may control the remaining component carriers.

Carrier aggregation is applicable to both the uplink and the downlink. In a time division duplexing (hereinafter, referred to as "TDD") system, a downlink signal and an uplink signal are transmitted through a plurality of carriers and, in a frequency division duplexing (hereinafter, referred to as "FDD")

system, a plurality of carriers may be used in each of the uplink and the downlink. A conventional LTE Rel-8 system supports transmission/reception within a single carrier although uplink and downlink bandwidths may be differently set. However, an LTE-A system may manage a plurality of carriers through carrier aggregation and an FDD system may support asymmetric carrier aggregation in which the uplink and the downlink are different from each other in terms of the number of component carriers or the bandwidth of the component carrier.

Next, an initial access procedure will be described.

In the LTE Rel-8 system, the initial access procedure may be divided into a cell search procedure, a system information reception procedure and a random access procedure.

The cell search procedure is performed through a synchronization signal (hereinafter, referred to as "SS") including a primary synchronization signal (hereinafter, referred to as "PSS") and a secondary synchronization signal (hereinafter, referred to as "SSS"). A UE performs time and frequency synchronization and detects a partial cell ID by detecting a PSS, detects the remaining cell ID by detecting an SSS, and detects a CP and a frame boundary.

Figure 5:
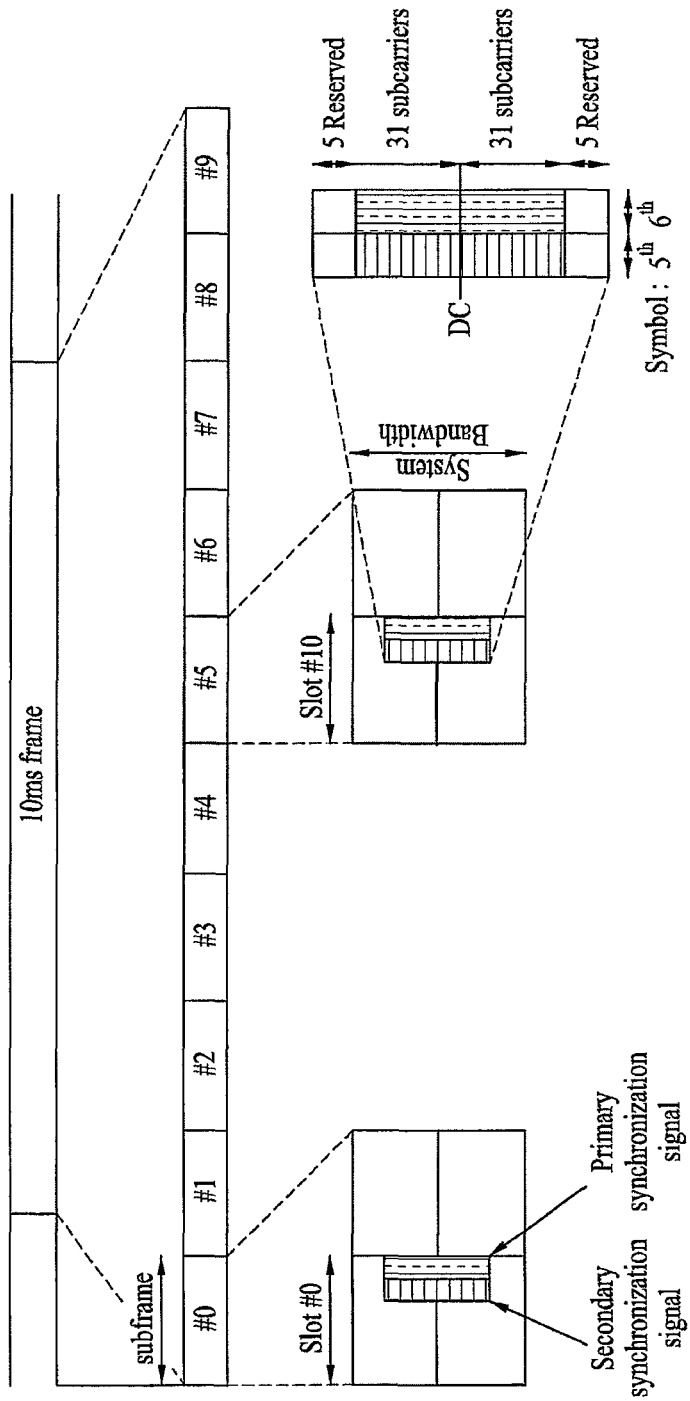
FIG. 5 is a diagram showing the structure of a PSS and an SSS of an LTE Rel-8 system.

FIG. 5 is a diagram showing the structure of a PSS and an SSS of an LTE Rel-8 system.

In FIG. 5, a PSS and an SSS are mapped to last two symbols of a first slot. As shown in FIG. 5, the PSS is transmitted using 72 subcarriers in a last OFDM symbol (a sixth OFDM symbol in case of a normal CP or a fifth OFDM symbol in case of an extended CP) of first slots (slot 0 and slot 10) of $0^{th}$ and $5^{th}$ subframes of a 10-ms frame and the SSS is transmitted using 72 subcarriers in a second to last OFDM symbol of first slots of $0^{th}$ and $5^{th}$ subframes. At this time, subcarriers among 72 subcarriers are reserved and 62 subcarriers are used to transmit the SS.

The system information reception procedure is performed through a physical broadcast channel (hereinafter, referred to as "PBCH") and a dynamic broadcast channel (hereinafter, referred to as "DBCH"). That is, a base station transmits system information through the PBCH and the DBCH.

The PBCH includes a downlink system bandwidth, PHICH configuration information and a system frame number (hereinafter, referred to as "SFN").

An LTE Rel-8 UE can explicitly identify a downlink system bandwidth, PHICH configuration information and SFN information through the PHCH and can implicitly identify the number of transmission antenna ports of the base station through the PBCH. Since the base station masks 16-bit CRC used to detect errors of the PBCH using a sequence according to the number of antennas, the terminal can implicitly identify the number of transmission antenna ports of the base station through the PBCH. Table 1 shows a masking sequence according to the number of transmission antenna ports.

TABLE 1

| Number of transmit antenna ports at BS | PBCH CRC mask |
| --- | --- |
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

Figure 6:
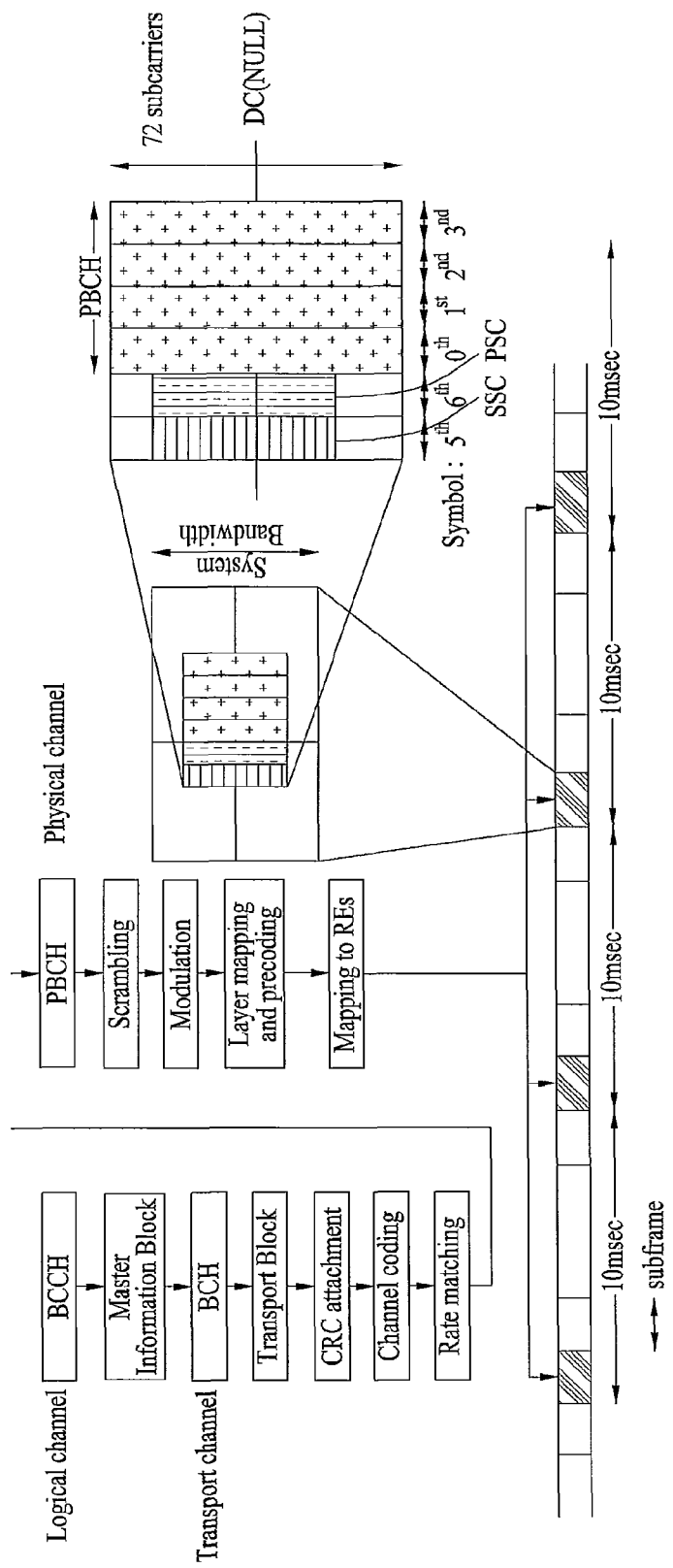
FIG. 6 is a diagram showing the structure of a PBCH.

The PBCH is modulated only using QPSK and is subjected to cell-specific scrambling before modulation. The PBCH is subjected to cell-specific scrambling, modulation, layer mapping and precoding and is then mapped to a resource element (RE). FIG. 6 shows the structure of the PBCH and Equation 1 shows the RE to which the PBCH is mapped.

$$k = \frac{N_{RB}^{DL} N_{sc}^{RB}}{2} - 36 + k', k' = 0, 1, \ldots, 71 \quad \text{Equation 1}$$

$$l = 0, 1, \ldots, 3$$

where, l denotes an OFDM symbol index of a slot 1 of a $0^{th}$ subframe. This is an example of mapping the PBCH to the RE in one frame, and a coded PBCH is mapped to four subframes during a period of 40 ms as shown in FIG. 6. A period of 40 ms is blind-detected and is not explicitly signaled. The PBCH is mapped to four OFDM symbols and 72 subcarriers in one subframe and is not mapped to the positions of REs in which reference signals for four antennas are located, regardless of the actual number of transmission antennas of the base station.

After receiving the PBCH, UEs may receive the DBCH transmitted through a physical downlink shared channel (PDSCH). The DBCH transmits a frequency of an uplink component carrier (hereinafter referred to as "UL CC") linked to a downlink component carrier (hereinafter, referred to as "DL CC"), a bandwidth, a downlink/uplink (DL/UL) physical channel, and cell-specific/UE-specific higher layer signaling for operations associated with a physical signal, in addition to system information transmitted through the PBCH.

The UE performs random access after receiving system information.

The LTE Rel-8 system may support only single connection based downlink and uplink component carriers having a default Tx-Rx separation, whereas the LTE-A system may aggregate component carriers satisfying the default Tx-Rx separation and component carriers which do not satisfy the default Tx-Rx separation so as to support a wideband. The default Tx-Rx separation refers to a gap between a center frequency of the downlink carrier and a center frequency of the uplink carrier defined in the LTE Rel-8 system.

The LTE Rel-8 UE completes random access on a component carrier in which a single downlink and a single uplink are linked one-to-one if contention-based random access is completed. Since the LTE Rel-8 UEs support the single linkage based DL and UL component carriers (CCs) having the default Tx-Rx separation, the LTE Rel-8 UEs perform random access in one UL CC upon initial access and perform random access to a target cell in one UL CC upon handover to another cell.

However, since the LTE-A UE using carrier aggregation may be assigned one or more UL CCs according to UE capabilities, and timing advances of the allocated one or more UL CCs may differ, random access needs to be performed in the assigned one or more UL CCs. If the DL CCs linked to the newly assigned UL CCs are additionally defined, since CQI associated information, power control offset information, etc. may be changed, an additional random access procedure may be necessary.

If the DL CCs or the UL CCs allocated to the UE are reconfigured, there is an ambiguity in timing advance values of different carrier aggregations and thus the UE needs to perform a process of solving such an ambiguity. For example, a downlink carrier becomes a reference time for transmitting an uplink carrier. If the downlink carrier is changed, a propagation path is changed and thus a delay profile occurs. Accordingly, a reference subframe boundary may be changed.

The timing advance values of the carriers may be changed due to a frequency selective repeater, a remote radio unit and an uplink coordinated multipoint (CoMP).

Figure 7:
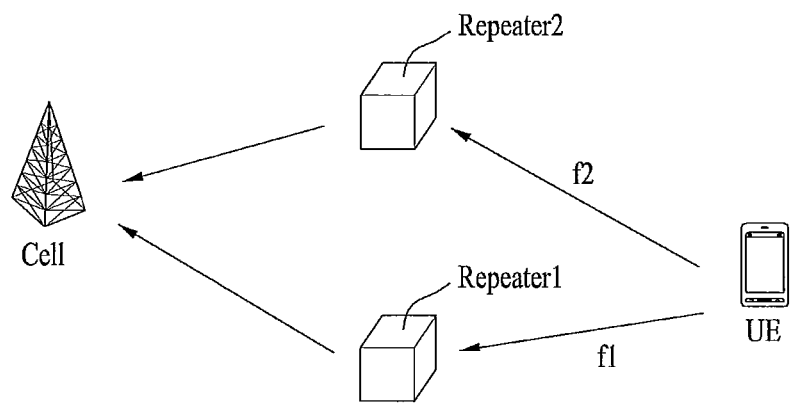
FIG. 7($a$) is a diagram showing a frequency selective repeater, FIG. 7($b$) is a diagram showing a remote radio unit, and FIG. 7($c$) is a diagram showing the case in which the same timing advance value is applied to a plurality of carriers if multicarrier is used.
Figure 7:
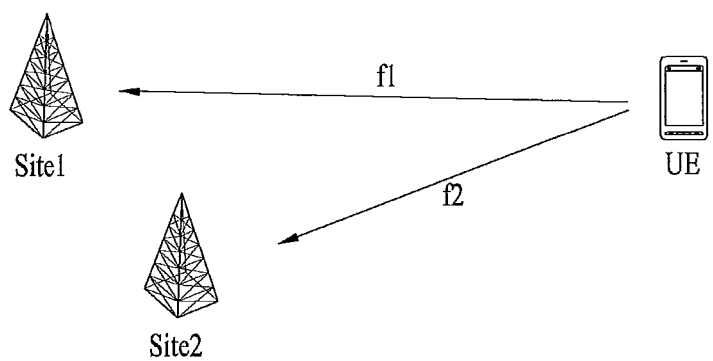
Figure 7:
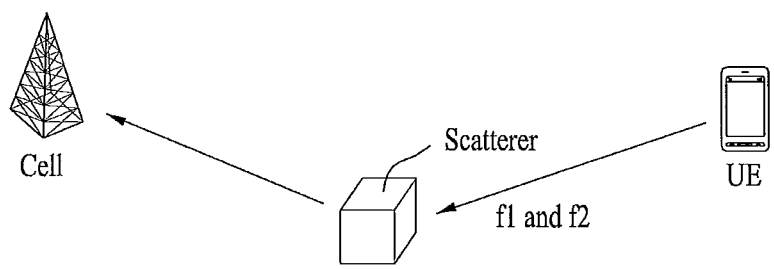

FIG. 7(a) is a diagram showing a frequency selective repeater, FIG. 7(b) is a diagram showing a remote radio unit, and FIG. 7(c) is a diagram showing the case in which the same timing advance value is applied to a plurality of carriers if multicarrier is used.

In FIG. 7(a), different CCs are in different propagation environments due to different frequency selective repeaters, and have different timing advances.

In FIG. 7(b), the UE communicates with two non-collocated sites on two carriers. Such a scenario occurs due to remote antennas or remote radio heads.

In FIG. 7(c), the same timing advance may be applied to two carriers in similar propagation environments.

Similarly to the case in which the downlink carrier is changed, even when the uplink carrier is changed, a propagation path is changed and thus a signal reference point is changed. If the DL CC or the UL CC is changed, a new timing advance must be detected. A method of detecting a new timing advance includes a method of utilizing a random access channel, a method of utilizing sounding resources, and a method of utilizing an uplink demodulation reference signal (hereinafter, referred to as "DM-RS").

First, the initial access procedure of an LTE-A UE using carrier aggregation will be described.

The cell search procedure is performed in raster units of a channel of 100 kHz and may follow a cell search procedure of the LTE Rel-8 system. Frequency time synchronization is performed and a partial cell ID is detected using a PSS. The remaining cell ID is detected and a CP and a frame boundary are detected using an SSS.

In the system information reception procedure, the UE decodes a PBCH to detect a downlink bandwidth, a PHICH configuration, an SFN, and the number of transmission antennas and decodes an SIB to detect an uplink carrier frequency, UL CC bandwidth information, a downlink/uplink physical channel and configurations of physical signals.

An LTE-A UE may also decode system information which is additionally defined for LTE-A. The LTE-A UE may support a carrier aggregation configuration which does not satisfy a default Tx-Rx separation defined in the Rel-8 and receives a variety of system information such as carrier configuration or connection information.

In the random access procedure, the UE transmits a first message (PARCH preamble) and receives a second message (random access response). The UE transmits a third message and receives a fourth message (contention resolution message), thereby completing contention resolution.

In the initial access procedure of the LTE-A UE, the base station may transmit a synchronization signal, system information, etc. so as to support initial access and camping of the UE. The initial access procedure of the LTE-A UE may be performed through a backward compatible CC satisfying a default Tx-Rx separation. Alternatively, the initial access procedure of the LTE-A UE may also be performed through a non-backward compatible CC which may be accessed by release UEs released prior to the LTE-A UEs but may not be accessed by LTE-A UEs. As another example, the initial access procedure of the LTE-A UE may also be performed through a CC satisfying a default Tx-Rx separation which is newly defined in the LTE-A system or a CC on which LTE-A SS and LTE-A system information are transmitted and initial access and camping are possible for the LTE-A. The initial access procedure of the CC on which the LTE-A SS and LTE-A system information are defined may be different from the above-described PSS and SSS detection and system information reception.

The LTE-A UE using carrier aggregation performs the above-described initial access procedure and operates based on a single downlink CC and a single uplink CC. After RRC connection based on the single downlink CC and the single uplink CC is established, configuration and/or activation of additional DL CCs and UL CCs may be performed through UE-specific dedicated signaling. Since CCs which are additionally configured and/or activated or the configurations thereof are changed after establishing RRC connection may have different time advance values and power control and the CQI configuration of the DL CCs may be differently set, additional random access needs to be performed with respect to one or more UL CCs which may have different timing advance values.

Different timing advances may be solved from the viewpoint of a system and a UE.

First, from the viewpoint of the system, timing of one uplink carrier is set according to a predetermined rule, in order to prevent mutual signal interference from being generated in a state in which different release UEs or UEs using different carrier assignments coexist. That is, a downlink carrier which becomes a reference for setting timing of the uplink carrier is set. That is, timings of specific uplink carriers are defined in association with specific downlink carriers. In this case, the downlink carrier is set in a system-specific manner. That is, all UEs connected to one base station use a DL CC specified by the base station as a reference for setting the timing of the uplink carrier.

At this time, the base station may inform the UEs of the DL CC which is used as the reference or may automatically set a DL CC suiting downlink and uplink linkage determined a DL-UL Tx-Rx separation reference in case of a UL CC used for the conventional UE to perform access. By setting the reference for the DL CC which may be commonly used by all versions of UEs, different timing advances are prevented from being calculated using different DL CCs as a reference.

Next, from the viewpoint of the UE, a method for detecting, at the base station, a DL CC used for the UE to perform access and performing correction based on a timing offset between the DL CC and a reference DL CC is possible. However, in this case, an ambiguity in which an actual timing advance is not accurately known between the UE and the base station occurs. That is, if a DL CC used by the UE as a reference has a delay profile different from that of a reference DL CC, the timing advance value actually used by the UE is not accurate. The coordination of the timing advance which may be generated between UEs is possible by specifying the reference DL CC. However, different DL CC and UL CC pairs may have different values per UE and different CCs have different timing advance values.

Random access is performed with respect to UL CCs, a timing advance value of which should be detected, if one or more DL CCs and UL CCs are additionally assigned after RRC connection based on single DL CC and UL CC, if one or more DL CCs are additionally assigned after RRC connection based on a single DL CC and UL CC, if one or more UL CCs are additionally assigned after RRC connection based on a single DL CC and UL CC, if one or more DL CCs and UL CCs are reconfigured after RRC connection based on a single DL CC and UL CC, if one or more DL CCs are reconfigured after RRC connection based on a single DL CC and UL CC, if one or more UL CCs are reconfigured after RRC connection based on a single DL CC and UL CC, if the reference DL CC should use a different UL CC.

Figure 8:
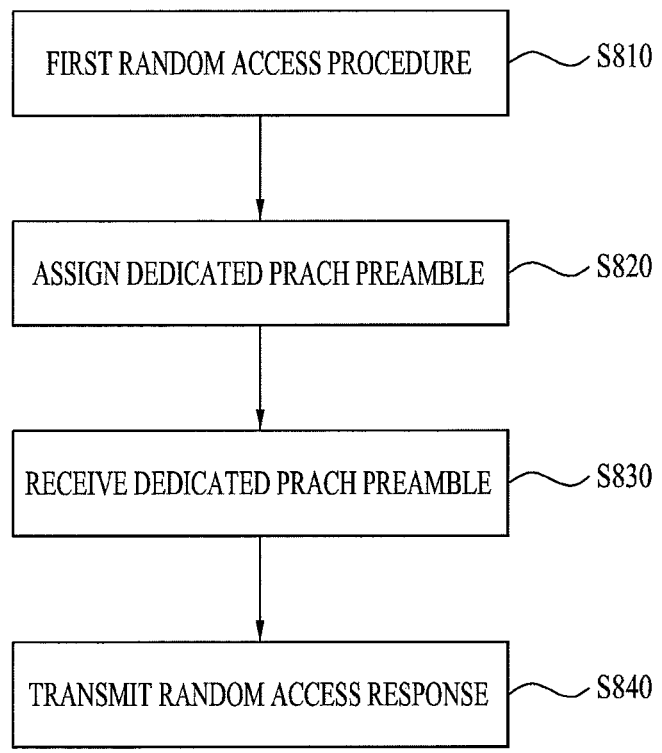
FIG. 8 is a diagram showing an initial access procedure according to an embodiment of the present invention.

Next, an initial access procedure according to an embodiment of the present invention will be described with reference to FIG. 8. FIG. 8 is a diagram showing an initial access procedure according to an embodiment of the present invention.

The base station and the UE perform a first random access procedure (S810). The first random access procedure is performed on a UL CC linked to a dedicated DL CC.

After completing the first random access procedure, the UE needs to perform additional random access if a CC is additionally assigned or the DL CC and the UL CC are reconfigured.

Accordingly, the base station assigns, to the UE, a dedicated physical random access channel (hereinafter, referred to as "PRACH") preamble for a second random access procedure on the UL CC which is additionally assigned or the UL CC which is reconfigured (S820). At this time, the base station may also specify time and frequency domains in which the dedicated PRACH will be transmitted.

The dedicated PRACH may be configured in the form of a channel which is always present. If the timing advance value cannot be frequently detected through random access, as necessary, the dedicated PRACH may be configured in the form of a channel which is temporarily generated. If initial access is not allowed, all available preambles are used as resources for detecting additional timing advances and the preamble information may be sent to the UEs as UE-specific resources through scheduling.

After performing initial random access, if a plurality of UL CCs is additionally assigned by dedicated signaling or the configurations thereof are changed after establishing RRC connection, the base station may divide the plurality of UC CCs into UL CC groups such that UL CCs using the same timing advance belong to the same group, and assign a dedicated PRACH preamble for random access to each UL CC group. At this time, time and frequency positions in which the dedicated PRACH preamble will be transmitted may be also specified.

The UC CCs may be divided into UL CC groups such that UL CCs located in contiguous bands belong to the same UL CC group. Although the UL CC group information is preferably specified by the base station, in order to reduce unnecessary overhead, the UE may automatically determine UL CCs located in contiguous bands as a group using the same timing advance. The reference for the contiguous bands may be determined depending on whether contiguous carriers are used or in the form of a frequency band specified in the spectrum specified by LTE-A.

Information about the UL CC group using the same timing advance may be transmitted through system information after initial access. Information about the UL CC group may be transmitted as cell-specific information or UE-specific information.

The base station may transmit information about the dedicated PRACH preamble in a state of being included in signaling for configuring and activating multiple DL CCs and UL CCs through UE-specific dedicated signaling after establishing RRC connection based on a single DL CC and UL CC. That is, the base station may send a configuration of a UL CC and a dedicated PRACH preamble set assigned thereto through dedicated signaling for configuring and activating the CCs. Alternatively, if the UL CCs are configured through dedicated signaling for configuring and activating CCs, the base station may transmit a dedicated PRACH preamble set through DL CCs linked to the UL CCs and the UE may perform random access using the dedicated preamble set.

The UE which is assigned the dedicated PRACH preamble transmits the assigned dedicated PRACH preamble to the base station in order to attempt random access and the base station receives the dedicated PRACH preamble from the UE (S830). That is, the UE performs random access for UL CCs or UL CC groups which are additionally configured, reconfigured or activated in a UE-specific manner using the dedicated preamble or dedicated preamble set.

If the base station assigns a dedicated PRACH preamble to a UL CC group using the same timing advance, the additional random access procedure need not be performed with respect to all CCs in one UL CC group, but needs to be performed only with respect to one reference UL CC such as a primary carrier or a reference carrier of the UL CC group. Thus, it is possible to reduce complexity of the additional random access procedure. That is, if the dedicated PRACH preamble is assigned to the UL CC group using the same timing advance, the base station receives the dedicated PRACH preamble through one of a plurality of UL CCs belonging to the UL CC group.

In case of the LTE-A UE using carrier aggregation, a UL CC or a UL CC group, additional random access of which is performed, may have a structure different from that of initial random access, because initial access has been completed based on a single DL CC and UL CC and contention resolution has been completed. Accordingly, the random access procedure of the additionally assigned UL CC or UL CC group may not need to perform the processes of transmitting or receiving the first to fourth messages. This is because only the timing advance for the additional UL CC or UL CC group is received in a state of informing the cell that the UE enters the cell in the initial access procedure and completing contention resolution with the base station.

Accordingly, additional random access may be performed by performing only two processes including transmission of the first message using the dedicated PRACH preamble and reception of the second message, thereby detecting the timing advances of one or more UL CCs.

Figure 9:
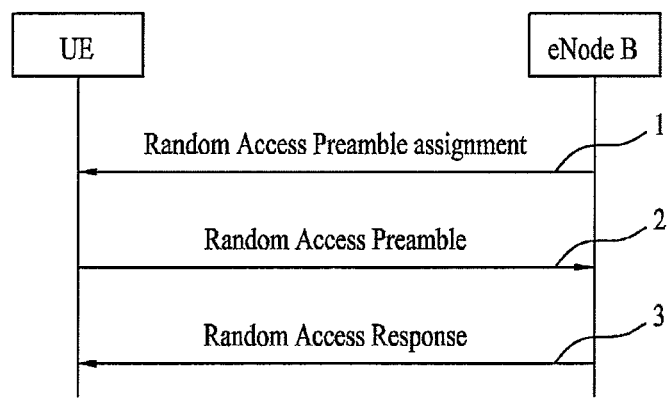
FIG. 9 is a diagram showing a contention-free random access procedure.

Alternatively, the random access procedure of the additionally assigned UL CC or the UL CC group may follow a contention-free random access procedure defined in LTE Rel-8. FIG. 9 is a diagram showing a contention-free random access procedure.

The base station transmits a random access response to the UE (S840).

The base station may transmit the timing advance of the UL CC or the UL CC group, a power control offset and CQI request information to the UE through the random access response. In a process of receiving, at an LTE-A UE using carrier aggregation, a random access response, the base station may use a second message format of the conventional LTE Rel-8 or a new second message format of the LTE-A for additional random access.

If the second message format of the conventional LTE Rel-8 is used, the base station uses the second message format of the conventional Rel-8 without change, recognizes only a timing advance command necessary for the additionally assigned UL CC or UL CC group or a part of UL grant, such as UL delay, a CQI request and a TPC command, among information fields included in a RAR as valid information, and ignores the remaining fields. If a C-RNTI is differently set on a per DL CC basis, a temporary C-RNTI may be included in valid RAR content. If DL CCs use the same C-RNTI, a C-RNTI used for a UL CC already linked to another DL CC may be transmitted in a state of being included in a RAR.

Alternatively, random access of the additionally assigned UL CC may be performed using all fields included in the RAR using the second message format of the conventional Rel-8 without change.

If the new second message of the LTE-A for additional random access is used, only fields necessary for additional random access due to carrier aggregation are defined in a new RAR format. The new RAR format may include a timing advance command, UL delay, a CQI request, a TPC command, etc. If a C-RNTI is differently defined on a per DL CC basis, a temporary C-RNTI may be included in a RAR.

A carrier on which the random access response is transmitted may be changed according to a random access configuration. For example, information corresponding to the second message may be transmitted through a carrier which is originally operated, that is, a primary carrier, or a cell-specific/UE-specific carrier through which dedicated preamble information was transmitted or which is specified in advance.

A method for transmitting the random access response on all DL CCs without defining a procedure is possible. In particular, if the amount of RAR information is not large, the random access response may be transmitted through a PDCCH rather than a PDSCH. That is, the random access response may have a structure scrambled through a C-RNTI of the UE on the carrier while being transmitted through the PDCCH, regardless of on which carrier the random access response is transmitted. The transmitted random access response may have a structure different from that of the second message as described above.

In reception of the timing advance information, the UE may receive timing advance information through a DL CC indicating a new UL CC, which is received from the base station. At this time, the received timing advance information may be transmitted in the form of combining timing advance values of all UL CCs for transmitting a preamble, and order of these values may be specified according to order of UL CCs or along with UL CC indexes.

In reception of timing advance information, the UE may receive RAR information from DL CC on which a RAR for a UL CC will be transmitted. In this case, the UE may perform access after system information of the DL CC is received. If the RAR information is received on the DL CC, blind decoding complexity may be increased. However, from the viewpoint of the base station, independence between carriers is advantageously provided. If the channel assigned at this time is different from an initial access channel, the transmitted RAR may be scrambled with a value different from an RA-RNTI for a PRACH which is conventionally defined.

The foregoing is applicable to all DL-UL configurations. For example, if a specific DL-UL pair is specified, a dedicated preamble must be transmitted using this pair. At this time, a relation between a DL CC and a UL CC may be defined as a cell-specific relation between a DL CC and a UL CC. If several DL CCs are specified with respect to one UL CC in a cell-specific manner, a subframe boundary is set based on a specific reference DL CC or a reference time is set using an average of subframe boundaries of all DL CCs so as to transmit a dedicated preamble. However, the relation between the DL CC and the UL CC may be specified in a UE-specific manner. At this time, a reference DL CC may be directly specified if the base station transmits the dedicated preamble on a specific UL CC. At this time, the CC is specified using a method of determining a subframe boundary based on a carrier which is already defined as a downlink primary carrier or a DL CC decided while specifying a dedicated preamble.

Next, a method for estimating a timing advance using a sounding reference symbol or a DM-RS will be described.

The sounding reference symbol and the DM-RS use cyclic shift and thus have a structure for easily estimating timings.

For example, in order to detect a timing advance value using the DM-RS, the base station must inform the UE of a bandwidth and a cyclic shift value of a DM-RS available in the UE in a specific subframe. The base station must perform scheduling so as to minimize interference with a DM-RS used by another UE in a corresponding band.

Then, a specific UE may generate a structure for transmitting a specific DM-RS through one symbol or two or more symbols. As a signaling method therefor, a method of utilizing grant for UL resource assignment without change is possible. However, since a step of detecting a timing advance value of a new UL CC is mostly performed when a carrier configuration is changed, the timing advance value may be specified and sent while performing a step associated with this message, that is, while being included in the same dedicated signaling or while configuring a CC in a procedure.

The timing advance value may be corrected using the sounding reference symbol. Even in this case, the base station must inform the UE of information about the band or cyclic shift to be used in order to transmit a sounding preamble. At this time, an SRS configuration message used to configure the sounding reference symbol may be used without change. The number of times that the message is used is limited to one or several times. Associated information may be transmitted as a CC configuration message similarly to a method decided for the DM-RS or the dedicated preamble or as an individual message in the process.

The process of detecting the timing advance value may be classified into two methods. If a separation between DL CCs or UL CCs is not large, that is, if a frequency separation on a frequency axis is not large, the timing advance value is not rapidly changed. Accordingly, in this case, the timing advance value is preferably corrected using the DM-RS or the sounding reference symbol.

In contrast, if the frequency is rapidly changed between DL CCs or UL CCs, since the timing advance value of the CC is significantly different from the already used timing advance value, a dedicated RACH preamble is preferably used in order to prevent interference between signals of different UEs.

Accordingly, if such a concept is applied to timing advance update, timing advance update is performed based on the DM-RS or the SRS if the CCs are present in the same frequency band and the timing advance value may be corrected using an RACH preamble if the CC is changed to another frequency band.

In this case, the UE may differently analyze a specific bit field according to a situation in which a CC is changed.

If the timing advance is corrected using the DM-RS or the sounding reference symbol, a method of receiving a timing advance correction value is necessary. At this time, an existing timing advance correction message may be reused and a carrier indicator indicating a carrier is necessary. That is, if both a DL CC and a UL CC associated therewith are added, a timing advance correction value of the UL CC is received on the DL CC. In this case, the existing timing advance correction value structure may not be changed. However, the timing advance correction value should be used to correct only the timing advance value of the UL CC linked to the DL CC.

If only a UL CC is added without adding a DL CC, since the DL CC is not additionally assigned, the timing advance correction value is used for the UL CC to transmit the DM-RS or the sounding information and thus is distinguished from the timing advance correction value for the UL CC linked to the DL CC. It is necessary to indicate for which UL CC the timing advance correction value is used, using a carrier indicator or through CRC scrambling. Accordingly, the timing advance correction value without carrier indicator is used only for the UL CC linked to the DL CC and separate signaling is necessary with respect to the remaining UL CCs.

Figure 10:
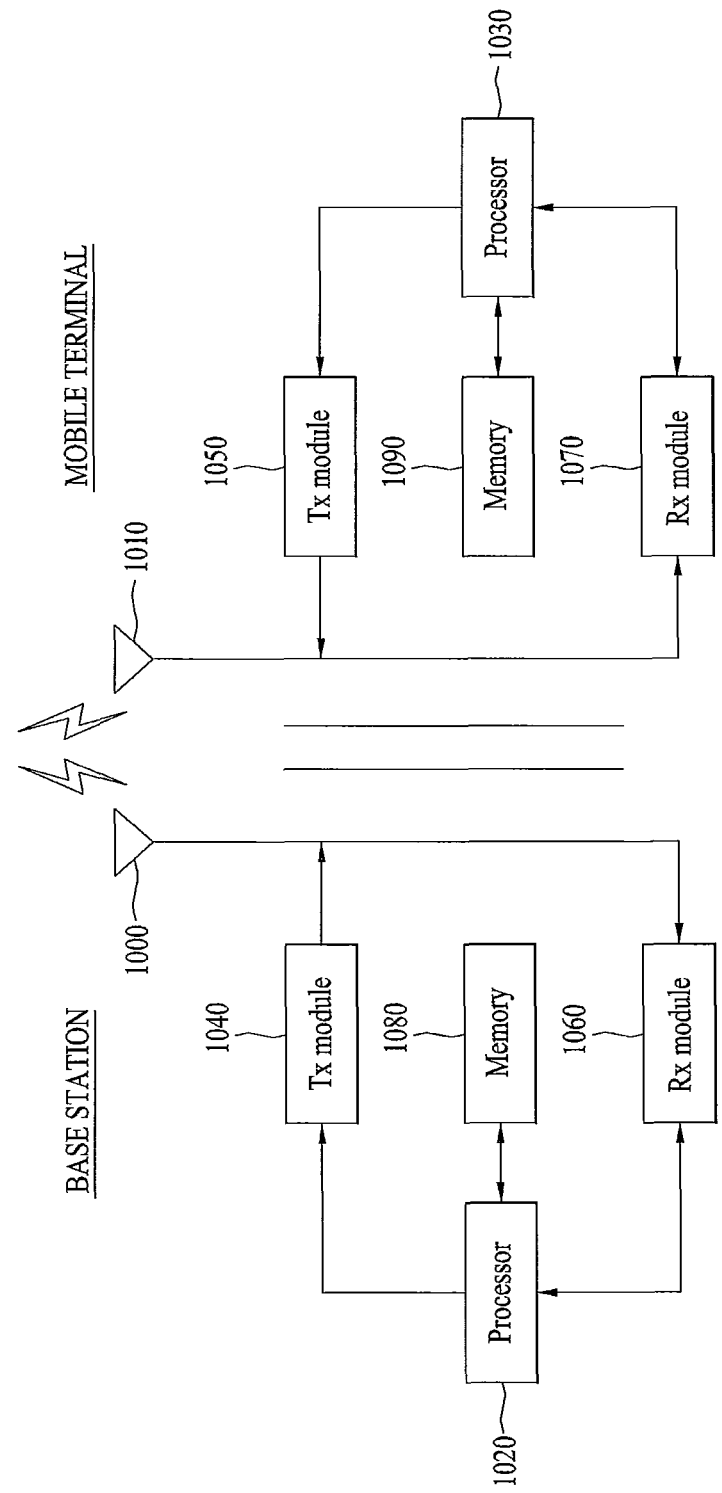
FIG. 10 is a diagram showing the configuration of a mobile terminal and a base station in which the embodiments of the present invention are implemented.

FIG. 10 is a diagram showing the configuration of a mobile terminal and a base station in which the embodiments of the present invention are implemented.

A mobile terminal (AMS) and a base station (ABS) include antennas 1000 and 1010 for transmitting and receiving information, data, signals and/or messages, transmission (Tx) modules 1040 and 1050 for controlling the respective antennas so as to transmit messages, reception (Rx) modules 1060 and 1070 for controlling the respective antennas so as to receive messages, memories 1080 and 1090 for storing information associated with the communication with the ABS, and processors 1020 and 1030 for controlling the Tx modules, the Rx modules and the memories, respectively. At this time, the base station may be a femto base station or a macro base station.

The antennas 1000 and 1010 serve to transmit the signals generated by the Tx modules 1040 and 1050 to external devices or to receive RF signals from external devices and delivering the signals to the Rx modules 1060 and 1070. If a Multi-Input Multi-Output (MIMO) function is supported, two or more antennas may be included.

The processors 1020 and 1030 control the overall operations of the AMS and the ABS. In particular, the processor may perform a control function for implementing the embodiments of the present invention, a MAC frame variable control function according to service characteristics and propagation environments, a handover function, an authentication and encryption function, etc. In addition, the processors 1020 and 1030 may further include encryption modules for controlling encryption of various messages and timer modules for controlling transmission/reception of various messages.

The processor 1020 of the ABS assigns, to the AMS, a dedicated PRACH preamble for second random access on a UL CC which is additionally assigned or reconfigured after first random access. At this time, the processor 1020 of the ABS may assign, to the AMS, a time and frequency domain in which the dedicated PRACH preamble will be transmitted.

If a plurality of UL CCs is additionally assigned or the configurations thereof are changed after first random access, the processor 1020 of the ABS may divide the plurality of UL CCs into UL CC groups such that UL CCs using the same timing advance belong to the same group and assign the dedicated PRACH preamble for second random access in the UL CC group to the AMS.

The Tx modules 1040 and 1050 may perform predetermined coding and modulation with respect to signals and/or data which are scheduled by the processors and are transmitted to the external devices, and send the signals and/or data to the antennas 1000 and 1010.

The Tx modules 1040 of the ABS transmits, to the AMS, information about the dedicated PRACH preamble assigned to the AMS by the processor 1020 of the ABS.

The Tx module 1050 of the AMS transmits the dedicated PRACH preamble allocated by the ABS to the ABS and performs a random access procedure, in order to obtain the timing advance of the UL CC which is additionally assigned or reconfigured after first random access.

The Rx modules 1060 and 1070 may perform decoding and demodulation with respect to the RF signals received through the antennas 1000 and 1010, restore the signals to the format of original data, and send the signals to the processors 1020 and 1030.

The Rx module 1060 of the ABS receives the dedicated PRACH preamble from the AMS.

The Rx module 1070 of the AMS receives information about the dedicated PRACH preamble for second random access on the UL CC which is additionally assigned or reconfigured after first random access.

The memories 1080 and 1090 may store programs for processing and control of the processors and perform a function for temporarily storing input/output data (in case of the mobile station, the uplink (UL) grant allocated by the base station, system information, a station identifier (STID), a flow identifier (FID), an action time, region assignment information, frame offset information, etc.).

In addition, the memories may include at least one storage medium such as a flash memory type, hard disk type, multimedia card micro type and card type memory (e.g., an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disc.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

The invention claimed is:

1. A method of supporting random access of a user equipment (UE) in a base station of a wireless communication system supporting carrier aggregation, the method comprising:
   transmitting, to the UE, an activation message for activating a plurality of uplink component carriers (UL CCs) to be used for the carrier aggregation after a first random access is finished,
   wherein the activation message includes information on a dedicated physical random access channel (PRACH) preamble for controlling timing advance of the plurality of UL CCs in each of UL CC groups which divide the plurality of UL CCs into UL CC groups such that UL CCs using the same timing advance belong to the same group; and
   receiving one or more dedicated PRACH preambles for a second random access to perform controlling of timing advance of the plurality of UL CCs from the UE,
   wherein the activation message includes one or more dedicated PRACH preambles to be used for each UL CC group during a procedure of the second random access, and
   wherein one or more of the dedicated PRACH preambles for the second random access are received from the UE through a reference carrier of each of the UL CC groups.

2. The method according to claim 1, wherein the activation message further includes information on a time and frequency domain in which the dedicated PRACH preamble will be transmitted.

3. The method according to claim 1, wherein the activation message is transmitted to the UE through UE-specific dedicated signaling.

4. A random access method in a user equipment (UE) of a wireless communication system supporting carrier aggregation, the random access method comprising:
receiving, from a base station, an activation message for activating a plurality of uplink component carriers (UL CCs) to be used for the carrier aggregation after a first random access is finished,
wherein the activation message includes information on a dedicated physical random access channel (PRACH) preamble for controlling timing advance of the plurality of UL CCs in each of UL CC groups which divide the plurality of UL CCs into UL CC groups such that UL CCs using the same timing advance belong to the same group; and
transmitting one or more dedicated PRACH preambles for a second random access to perform the controlling of timing advance of the plurality of UL CCs to the base station,
wherein the activation message includes one or more dedicated PRACH preambles to be used for each UL CC group during a procedure of the second random access, and
wherein one or more of the dedicated PRACH preambles for the second random access are transmitted to the base station through a reference carrier of each of the UL CC groups.

5. The random access method according to claim 4, wherein the activation message further includes information on a time and frequency domain in which the dedicated PRACH preamble will be transmitted.

6. The random access method according to claim 4, wherein the activation message is received from the base station through UE-specific dedicated signaling.

7. A base station of a wireless communication system supporting carrier aggregation, comprising:
a transmission module configured to transmit an activation message to a user equipment (UE), for activating a plurality of uplink component carriers (UL CCs) to be used for the carrier aggregation after a first random access is finished,
wherein the activation message includes information on a dedicated physical random access channel (PRACH) preamble for controlling timing advance of the plurality of UL CCs in each of UL CC groups which divide the plurality of UL CCs into UL CC groups such that UL CCs using the same timing advance belong to the same group;
a reception module configured to receive one or more dedicated PRACH preambles for a second random access to perform the controlling of timing advance of the plurality of UL CCs from the UE; and
a processor configured to control the transmission module and reception module,
wherein the activation message includes one or more dedicated PRACH preambles to be used for each UL CC group during a procedure of the second random access, and
wherein one or more of the dedicated PRACH preambles for the second random access are received from the UE through a reference carrier of each of the UL CC groups.

8. The base station according to claim 7, wherein the processor is configured to control the transmission module to transmit the activation message further including information on a time and frequency domain in which the dedicated PRACH preamble will be transmitted.

9. The base station according to claim 7, wherein the transmission module transmits the activation message to the UE through UE-specific dedicated signaling.

10. A user equipment (UE) of a wireless communication system supporting carrier aggregation, comprising:
a reception module configured to receive, from a base station, an activation message for activating a plurality of uplink component carriers (UL CCs) to be used for the carrier aggregation after a first random access is finished,
wherein the activation message includes information on a dedicated physical random access channel (PRACH) preamble for controlling timing advance of the plurality of UL CCs in each of UL CC groups which divide the plurality of UL CCs into UL CC groups such that UL CCs using the same timing advance belong to the same group; and
a transmission module configured to transmit one or more dedicated PRACH preambles for a second random access to perform the controlling of timing advance of the plurality of UL CCs to the base station,
wherein the activation message includes one or more dedicated PRACH preambles to be used for each UL CC group during a procedure of the second random access, and
wherein one or more of the dedicated PRACH preambles for the second random access are transmitted to the base station through a reference carrier of each of the UL CC groups.

11. The UE according to claim 10, wherein the reception module receives the activation message further including information on a time and frequency domain in which the dedicated PRACH preamble will be transmitted.

12. The UE according to claim 10, wherein the reception module receives the activation message from the base station through UE-specific dedicated signaling.

* * * * *